United States Patent Office 3,222,194
Patented Dec. 7, 1965

3,222,194
METHOD OF PREPARING A DRIED EGG PRODUCT
James M. Gorman and Verl H. Hannah, Topeka, Kans., assignors, by mesne assignments, to Norris Grain Company, Chicago, Ill., a corporation of Illinois
No Drawing. Filed Sept. 11, 1961, Ser. No. 137,012
4 Claims. (Cl. 99—210)

The invention is directed to a new and improved dried egg product and method of preparing same, the product being particularly adapted for reconstitution with water and for use in the preparation of cooked egg dishes such as egg omelets, scrambled eggs and the like.

The egg product industry has made many efforts toward improving the quality, usefulness and acceptance of dried egg products since the widespread use of such products during World War II. During the war millions of pounds of liquid whole eggs were dried by a conventional spray drying process and used for feeding civilian and military populations in various countries throughout the world. The dried whole eggs when reconstituted with water and used in the preparation of egg dishes, such as omelets and scrambled eggs, performed poorly and did not exhibit adequate organoleptic appeal although they supplied the vital dietary protein which was not readily available from other sources. Poor appearance and taste of the reconstituted cooked product virtually completely eliminated all consumer demand for the product with regard to its use in moderately cooked egg dishes. Accordingly, the dried egg product industry has had to limit its marketing efforts to dried egg products designed for use as ingredients in baked goods such as cakes or the like.

Continuing research has, among other things, established that storage life of dried whole eggs is a major problem as it has been found that solubility, palatability and color deterioration are proportional to time and temperature of storage. This problem of course is applicable to products intended for baked goods and through continuing research it has been found that deterioration in quality results at least in part from the reaction of the natural reducing sugar content of the whole egg with its protein and cephalin components. Shelf life of dried whole eggs has been extended appreciably by reducing the sugar content of the product. This has been done by subjecting liquid eggs to bacterial fermentation and by converting the sugar content to gluconic acid by enzyme conversion prior to drying. These procedures are well-known and widely practiced in the preparation of dried whole eggs for use in baked goods. Additionally, it has been found that drying the whole egg to a low moisture content and packaging the product in an atmosphere of nitrogen or nitrogen carbon dioxide also aids in extending shelf life. With these improvements, the industry currently processes millions of pounds of liquid whole eggs each year with the products being recommended for use in baked goods requiring eggs. These baked goods include breads, cakes and well-cooked dishes such as casseroles and custards. The current egg products have not been recommended for use in the preparation of cooked egg dishes, such as scrambled eggs, omelets, etc., as the reconstituted product tends to develop either into a firm rubbery jell or a weak watery jell or curdled appearance upon cooking.

It is an object of the present invention to provide a new and improved dried egg product particularly adapted for reconstitution with water and for use in the preparation of cooked egg dishes.

A further object is to provide a new and improved method of preparing a dried egg product which is particularly adapted for reconstitution with water and for use in the preparation of cooked egg dishes.

Still another object is to provide a new and improved dried egg product which upon reconstitution and cooking in the preparation of scrambled eggs or the like exhibits a tender jell-like firmness without water separation, the product upon preparation in accordance with the teachings of the invention exhibiting improved shelf life properties.

Other objects not specifically set forth will become apparent from the following detailed description of the invention.

The invention deals broadly with the concept of combining a starch with a neutralized dried egg material, the starch being present in the final product in quantities ranging from about 2% to about 20% based on the dry weight of the product. Preferably, the egg constituents of the product are desugarized in accordance with conventional procedures and are dried separately followed by recombining through dry blending. It has been found that separate drying of the egg white and egg yolk materials imparts improved performance, appearance and stability to the egg product. With regard to neutralization of the product, it has been found that the pH should preferably range from about 7 to 8. For use in the preparation of cooked egg dishes, the product will preferably include relatively small quantities of non-fat milk solids and salt.

The following are typical examples of the specially prepared dried egg product of the present invention:

Example I

| | Percent by weight |
|---|---|
| Pasteurized desugarized yolk solids | 63.9 |
| Pasteurized desugarized white solids | 24.3 |
| Starch | 2.0 |
| Non-fat milk solids | 7.0 |
| Baking soda | 1.7 |
| Salt | 1.1 |
| | 100.0 |

Example II

| | |
|---|---|
| Pasteurized desugarized yolk solids | 58.8 |
| Pasteurized desugarized white solids | 22.2 |
| Starch | 10.0 |
| Non-fat milk solids | 6.4 |
| Baking soda | 1.6 |
| Salt | 1.0 |
| | 100.0 |

Example III

| | |
|---|---|
| Pasteurized desugarized yolk solids | 52.2 |
| Pasteurized desugarized white solids | 19.8 |
| Starch | 20.0 |
| Non-fat milk solids | 5.8 |
| Baking soda | 1.4 |
| Salt | 0.8 |
| | 100.0 |

With regard to the preferred method of preparing the product of the present invention, fresh whole eggs are broken and separated into white and yolk constituents with these constituents then being subjected to bacterial fermentation or enzyme conversion for desugarization in the well-known manner. The constituents are then separately dried using spray drying equipment wherein the constituents are atomized at relatively high pressure into a drier through which hot air is blown. With regard to the particular product of the present invention bearing in mind its intended use, separate drying of the egg constituents is preferred as it has been found that the product exhibits improved performance, color and stability. In this regard the albumen if dried with the fatty yolk material is subject to damage. Accordingly, the white constituent should be subjected to atomizing pressures which preferably are no greater than about 2000 p.s.i. It has been found that atomizing pressures ranging from about 1000 to 2000 p.s.i. are capable of promoting efficient drying while protecting the material from modification or damage of an extent that the final dried product of the present invention does not perform as well as could be otherwise obtained. By comparison, the yolk constituent can be atomized at pressures ranging from about 3000 to 5000 p.s.i., without damage. Under these conditions the drying temperatures may be in the same range during the drying of each separate constituent. Thus the temperature of the incoming drying air may range from about 300° F. to 325° F. and the exhaust air temperature may range from about 150° F. to 175° F. Under the conditions specified, the temperature of the white constituent should not exceed 140° F. to prevent coagulation. In addition to the foregoing advantages, separate desugarization and drying of the egg constituents provides for more rigid bacteriological control.

The separately dried egg constituents are then dry blended together preferably in proportions corresponding generally to the fresh whole egg composition. Generally speaking, the natural proportion of white and yolk in a fresh egg based on the dried weight thereof is approximately 71.5% yolk and 28.5% white. The resultant dry blend is then neutralized by the addition of any suitable material thereto such as baking soda, potassium bicarbonate, sodium carbonate, etc. Egg yolk is generally rather acid and in order to obtain egg product performance of the type described above in the preparation of cooked egg dishes, it has been found important that the product be neutralized to an extent that the pH thereof will fall within the range of approximately 7 to 8. Preferably, the pH is adjusted to about 7.5. With separate drying of the egg constituents and pH adjustment the final egg product exhibits improved performance and improved texture characteristics in the preparation of cooked egg dishes. The adjustment of pH prevents the development of small curds in scrambled eggs prepared from the product.

An important aspect of the invention is the addition of a suitable starch to the product. Starch has been used in various egg dishes for water absorption purposes and also to add body to the preparation. However, it has been found that starch added to the dried egg product of the present invention functions to tenderize the jell firmness of the cooked dish while additionally eliminating water separation therefrom. The starch functions in the specially prepared product of the present invention to actually "dilute" the protein content thereof to an extent that the jell strength of the egg protein is modified. In this respect, the starch actually modifies the coagulating properties of the coagulating protein which is of considerable importance in connection with the use of the product in the preparation of cooked egg dishes. The starch constituent should be present in quantities ranging from about 2% to 20% based on the dry weight of the final product. Preferably, 10% starch is used in the preparation of a product which upon reconstitution with water can be moderately cooked in scrambled egg form and exhibit improved texture, stability and appearance. An increase in starch content increases tenderness of the final cooked dish.

Any suitable starch or starch bearing product may be used. By way of example, natural starches such as wheat starch and corn starch function quite well in the dried egg product. Waxy maize starches and starches modified by enzymatic, acid conversion or thermal treatment function equally well. Also, starch bearing products such as wheat flour, corn flour, etc., may be used. The starch constituent may be added to the egg material prior to or subsequent to drying. Preferably, the starch is added subsequent to drying for better product control.

Additional ingredients which are preferably added to the dried egg product include salt and non-fat milk solids. A small amount of salt is added to reproduce the saline environment of fresh eggs and it has been found that this additive improves the solubility of the dry product as well as the taste of the egg dish prepared therefrom. The non-fat milk solids are added in relatively small quantities to enhance the color and texture of the reconstituted egg product upon cooking thereof as scrambled eggs or as an omelet.

Obviously certain modifications and variations of the invention as hereinbefore set forth may be made without departing from the spirit and scope thereof, and therefore only such limitations should be imposed as are indicated in the appended claims.

We claim:

1. The method of preparing a dried egg product particularly adapted for reconstitution with water and for use in the preparation of cooked egg dishes, said method comprising separating the white and yolk constituents of fresh whole eggs, desugarizing said constituents, separately drying said constituents, dry blending said constituents in proportions corresponding to whole egg composition, neutralizing the dry blend, and adding a dry edible starch to said dry blend in quantities ranging from about 2% to 20% based on the dry weight of the product.

2. The method of claim 1 wherein the amount of starch added provides about 10% by weight of the product.

3. The method of claim 1 wherein baking soda is added to the dry blend to neutralize the same.

4. The method of preparing a dried egg product particularly adapted for reconstitution with water and for use in the preparation of cooked egg dishes, said method comprising separating the white and yolk constituents of fresh whole eggs, desugarizing said constituents, separately drying said constituents with the atomizing drying pressure used on said white constituent being no greater than about 2000 p.s.i., dry blending said constituents in proportions corresponding to whole egg composition, neutralizing the dry blend, and adding a dry edible starch to said dry blend in quantities ranging from about 2% to 20% based on the dry weight of the product.

References Cited by the Examiner

UNITED STATES PATENTS

| | | | |
|---|---|---|---|
| 236,598 | 1/1881 | Kirkham | 99—210 X |
| 1,076,147 | 10/1913 | Prevost | 99—210 |
| 2,476,412 | 7/1949 | Harris | 99—210 |
| 2,479,310 | 8/1949 | Chapin | 99—210 |
| 2,796,352 | 6/1957 | Forsythe et al. | 99—210 |
| 3,014,805 | 12/1961 | Mitz | 99—210 |

A. LOUIS MONACELL, *Primary Examiner.*

HYMAN LORD, *Examiner.*